May 17, 1966     J. J. CONWAY ETAL     3,251,452

ARTICLE SPACING APPARATUS FOR CONVEYOR SYSTEMS

Filed June 3, 1964     2 Sheets-Sheet 1

INVENTORS
J. J. CONWAY
M. W. SNELL

By A. J. Nugent
ATTORNEY

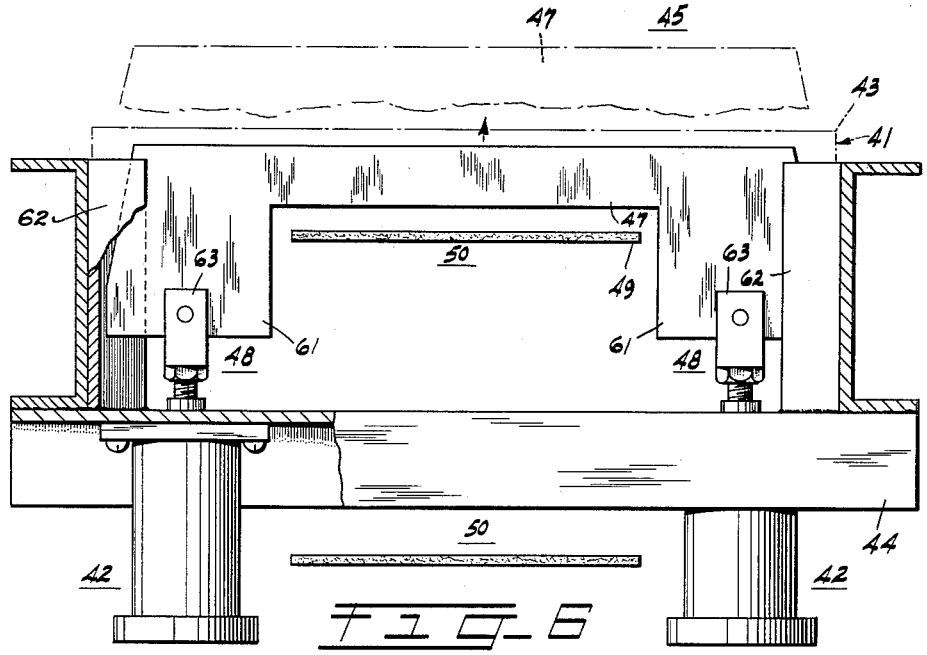
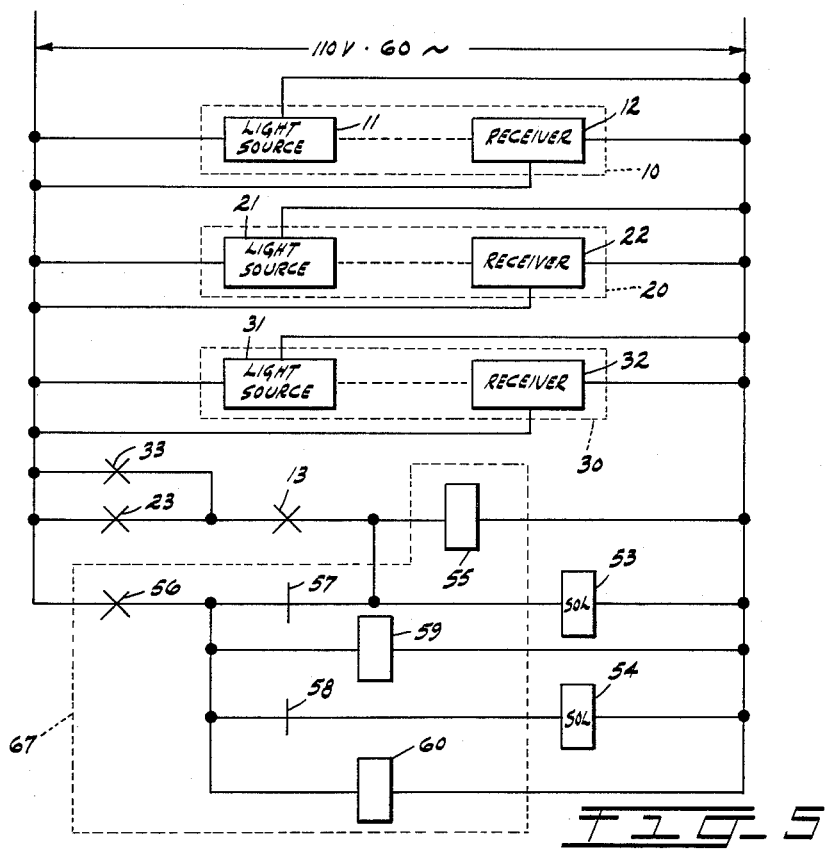

3,251,452
ARTICLE SPACING APPARATUS FOR CONVEYOR SYSTEMS
John J. Conway, Overland Park, Kans., and Mark W. Snell, Raytown, Mo., assignors to Western Electric Company, Incorporated, New York, N.Y., a corporation of New York
Filed June 3, 1964, Ser. No. 372,209
4 Claims. (Cl. 198—34)

This invention relates to conveyor systems and particularly to an article spacing apparatus for conveyor systems.

In manufacturing plants, conveyors are often used to transport articles from storage areas to production areas and between various work stations in accordance with predetermined instructions. A typical conveyor system for handling and automatically transferring tote pans, for example, includes photoelectric sensing means at each transfer station which operate a transfer mechanism when a particular coded designation appears on a pan. The operated transfer mechanism switches the pan onto a spur line either for final delivery to a designated location or preparatory to further transfer operations which divert the pan onto secondary spur lines.

In large conveyor systems however, it is necessary to place the pans on the conveyor at intervals sufficient to prevent interference from succeeding pans at a transfer position. When the pans are grouped too closely together on the moving conveyor, a problem arises at the transfer positions due to the fact that the transfer mechanism may jam or the sensing means may give faulty signals resulting in movement of pans to the wrong location. Even if the minimum loading interval is observed, the pan spacing is still difficult to maintain because of the different size pans and the relatively long distances they are sometimes required to travel.

Accordingly, an object of the invention is to provide an apparatus for furnishing a predetermined spacing between articles on a conveyor.

Another object of the invention is to provide an apparatus for spacing articles randomly supplied to a conveyor with a predetermined minimum spacing.

A more specific object of this invention is to provide an apparatus for sensing a succession of pans on a moving conveyor and adjusting the spacing between pans if below a predetermined spacing related to spur transfer time.

The invention, in its broader aspects, comprises an apparatus for spacing articles on a moving conveyor including sensing means mounted adjacent the conveyor for detecting whether the spacing between articles successively advancing on the conveyor is less than or greater than a predetermined minimum, means for lifting an article from the conveyor and then lowering the article onto the conveyor after a predetermined time interval, and actuating means responsive to the sensing means for operating the lifting and lowering means when the spacing between articles successively advancing on the conveyor is less than a predetermined minimum.

In general, the present invention contemplates an apparatus for spacing pans or trays on a live roller conveyor comprising a plurality of photoelectric cells positioned at fixed intervals along the conveyor and first and second air actuated tray stops disposed in the conveyor bed and responsive to the operation of the photoelectric cells. The photoelectric cells detect a tray which is not properly spaced from a preceding tray on the conveyor and activate the two tray stops. The tray stops physically lift the tray above the live roller conveyor halting the forward movement of that tray and the following trays. The tray stops are then alternately lowered at predetermined time intervals by operation of time delay relays controlled by the photoelectric cells. This action lowers and releases the tray with a predetermined tray spacing from a preceding tray thereby avoiding the interference which might otherwise occur at a transfer station. The following trays which may have accumulated on the conveyor are successively lifted and released in a similar manner.

Other objects and advantages of the present invention will be more apparent when considered in conjunction with the accompanying drawings wherein:

FIG. 1 shows a schematic plan view of the conveyor spacing apparatus comprising the present invention;

FIGS. 2, 3 and 4 illustrate a typical sequence of operations which will be described in detail with reference thereto in the body of the specification. More particularly, FIG. 2 shows a schematic side view of the apparatus with both tray stops in a raised position; FIG. 3 shows the apparatus with the first tray stop retracted; and FIG. 4 shows a pan accumulation at the second tray stop;

FIG. 5 shows the control circuit for the apparatus; and

FIG. 6 shows a section of the conveyor taken along the line 6—6 of FIG. 1 to illustrate the construction of a typical tray stop.

Figure 1:
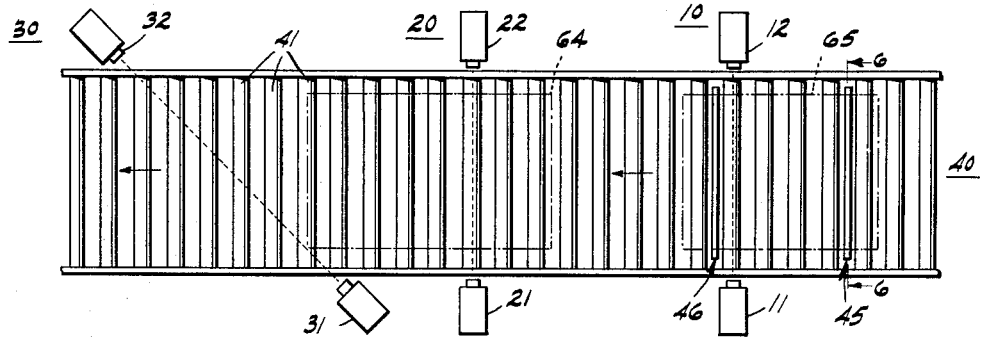
Figure 2:
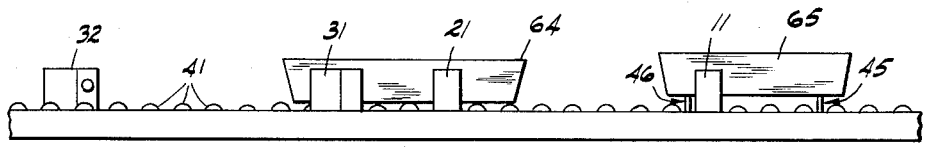

With reference to the drawings the invention in one preferred embodiment comprises a plurality of photoelectric detectors 10, 20 and 30 each including a light source 11, 21, and 31, respectively and a photoelectric receiver 12, 22 and 32 respectively, positioned at predetermined intervals along a live roller conveyor 40. As disclosed in FIGS. 1–4 a pair of stops 45 and 46 having upper portions 47 are normally positioned beneath the upper surface 43 of the rollers 41 in order to avoid interfering with pans which are already adequately spaced to facilitate switching operations at transfer stations. However, upon actuation of the detectors by a pair of improperly spaced pans, the stops 45 and 46 operate in a manner which will be described later in detail to space the pans a required distance apart.

The stops 45 and 46, one of which is depicted in FIG. 6, are each driven by air cylinders 42—42 fixedly mounted to the frame 44. A reciprocable connecting member 48 is mounted at one end to a cylinder 42 and at the other end 63 to the downwardly extending portion 61 of a stop 45 or 46 which is located between two adjacent rollers 41 and straddles the upper run of the driving belt 50. Upon actuation of the corresponding cylinders 42, the stops 45 and 46 are driven vertically upward with the downwardly extending portions 61 moving within a pair of guides 62 and the upper stop portion 47 projecting above the rollers 41. The stop portion 47 is designed to engage either the lower surface 51 or leading surface 52 of a pan to halt the movement thereof when the detectors 10 and 20 or 30 sense improperly spaced pans, see FIG. 4.

In operation, pans are placed at random intervals upon a conveyor 40 which travels in the indicated direction. A single pan or the first pan in a series passes through the detectors 10, 20 and 30 undisturbed by stops 45 and 46 but if a succeeding pan is not positioned a predetermined distance from the first pan, the beam of detector 10 will be broken at the same time as the beam of detector 20 or 30 to operate the stops 45 and 46 for spacing purposes. This condition is illustrated by the pans 64 and 65 appearing in phantom in FIG. 1 of the drawings.

Figure 3:
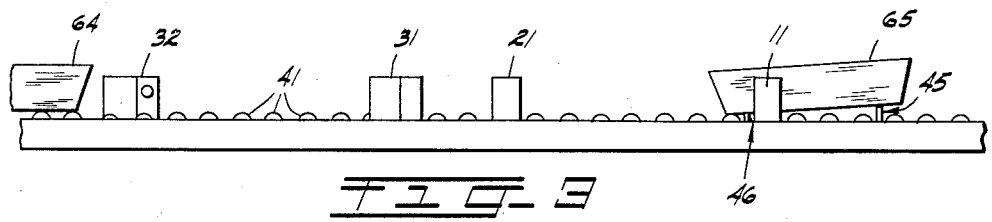

As shown in FIG. 5, the detached contacts 13, 23 and 33 are controlled by the respective photoelectric detectors 10, 20 and 30 to close when the corresponding light beam is interrupted. If the contacts 13 close at the same time as either contacts 23 or 33, the control relay 55 of the timing circuit 67 will be energized to initiate a spacing cycle. Relay 55 closes contacts 56 to energize solenoids 53 and 54 through the normally closed contacts 57 and 58 of timing relays 59 and 60 respectively. The solenoids 53 and 54 operate the respective stops 45 and 46 by controlling the air flow to the cylinders 42—42 associated with each stop. This action raises each stop portion 47 from beneath the rollers 41 to lift the tote pan 65 which is presently in the beam of detector 10 above the conveyor 40, see FIG. 2. After the leading pan 64 has moved ahead the required distance out of the beam of detector 30, relay 60 times out after a set time interval of approximately three seconds and de-energizes solenoid 54, lowering the stop portion 47 of stop 46. If no other pans have arrived at the spacing apparatus, the pan 65 will remain tilted from the conveyor bed as shown in FIG. 3 until relay 59 times out and permits stop 45 to lower the pan onto the conveyor. This sequence provides a double space.

Figure 4:
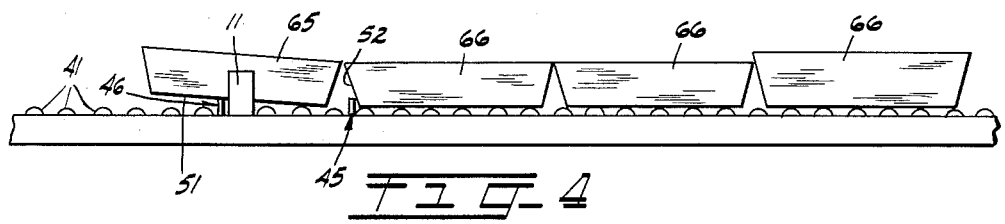

If a group of pans arrive at the spacing apparatus, as shown in FIG. 4 then the lifted pan 65 would be shoved off stop 45 by the following pans 66 and remain tilted by stop 46 until relay 60 associated with solenoid 54 times out, releasing the pan 65. The pan or pans 66 held back by stop 45 would advance after relay 59 associated with solenoid 53 times out during an interval approximately twice the interval of relay 60. The cycle then repeats as long as the pans 66 are less than the minimum space required by the positions of detectors 20 and 30.

Detectors 10 and 20 are both positioned with their beams extending at right angles to the direction of pan movement in order to detect pans which are butted together or positioned only a short distance apart. On the other hand, detector 30 is positioned with its beam extending at an angle to the conveyor in order to detect pans which are not close enough to be picked up by detectors 10 and 20 but which nevertheless are not adequately spaced to facilitate automatic transfers. In the illustrated embodiment a pan spacing of approximately five feet is required on a conveyor moving at about 90 feet per minute. The spacing apparatus is quite flexible since the timing cycle and the positions of the detectors may be readily adjusted to obtain any desired spacing with different size pans.

It is to be understood that the above-described arrangements are simple illustrative examples of the application of the principles of the invention. Numerous other arrangements may be readily devised by those skilled in the art which will embody the principles of the invention and fall within the spirit and scope thereof.

What is claimed is:
1. An apparatus for spacing articles on a live roller conveyor comprising:
    a first and a second stop member normally mounted transversely with reference to the conveyor and beneath the surface of the rollers to permit movement of articles therealong,
    an individual air cylinder mounted to each end of each stop member,
    a first and a second photoelectric detector positioned a predetermined distance apart and mounted so the light beam is at right angles to the conveyor,
    a third photoelectric detector spaced apart from the second detector and mounted so the light beam extends angularly with reference to the conveyor,
    a pair of solenoids, one being connected to each of the air cylinders mounted to a particular stop member,
    a timing circuit for operating the solenoids,
    a control relay operable when an article is sensed by the first detector and one of the other detectors to operate the timing circuit to actuate the solenoids and control the movement of the first and second stop members to halt the movement of an improperly spaced article.

2. An apparatus in accordance with claim 1 wherein the timing circuit comprises:
    a first timing relay controlling the operation of the solenoid which operates the first stop, and
    a second timing relay controlling the operation of the solenoid which operates the second stop, said relay having a period of operation approximately half the period of the first relay.

3. An article spacing apparatus for a conveyor comprising:
    a pair of vertically movable members normally positioned beneath the rollers to permit article travel therealong,
    actuable means operatively connected to each of the vertically movable members,
    a first and a second detector positioned a predetermined distance apart each including a light transmitter and a photoelectric receiver mounted so that the light extends over a path at right angles to the conveyor to sense articles on the conveyor and to provide a signal if both detectors are activated by closely spaced articles,
    a third detector including a light transmitter and a photoelectric receiver mounted so that the light beam extends angularly with reference to the conveyor to sense articles on the conveyor and provide a signal if the third detector and the first detector are both activated by articles which are spaced apart less than a predetermined distance, and
    means responsive to the signals generated by the detectors to operate the actuable means to move the vertically movable members above the roller surface to halt the movement of any article which is improperly spaced from a preceding article.

4. An article spacing apparatus for a conveyor comprising:
    a pair of vertically movable members normally positioned beneath the rollers to permit article travel therealong,
    actuable means operatively connected to each of the vertically movable members,
    sensing means positioned at predetermined intervals along the conveyor to detect the spacing between articles, and
    means responsive to the sensing means to operate the actuable means to move the vertically movable members above the roller surface to halt the movement of articles which are improperly spaced from a preceding article, said means comprising:
        a relay activated by the sensing means to operate the actuble means, and
        individual timing means to control the operation of the actuable means in order to regulate the time interval during which each member will halt the movement of articles along the conveyor.

References Cited by the Examiner

UNITED STATES PATENTS

| | | | |
|---|---|---|---|
| 2,662,633 | 12/1953 | Kingsley | 198—37 X |
| 2,840,223 | 6/1958 | Schoppee | 198—34 |
| 2,924,323 | 2/1960 | Holben | 198—34 |
| 3,162,294 | 12/1964 | Dieter | 198—34 |

HUGO O. SCHULZ, *Primary Examiner.*

SAMUEL F. COLEMAN, *Examiner.*

R. E. KRISHER, *Assistant Examiner.*